May 10, 1927. 1,628,536
P. FASSON ET AL
AUTOMATIC SAFETY TROLLEY
Filed April 30, 1925   4 Sheets-Sheet 4
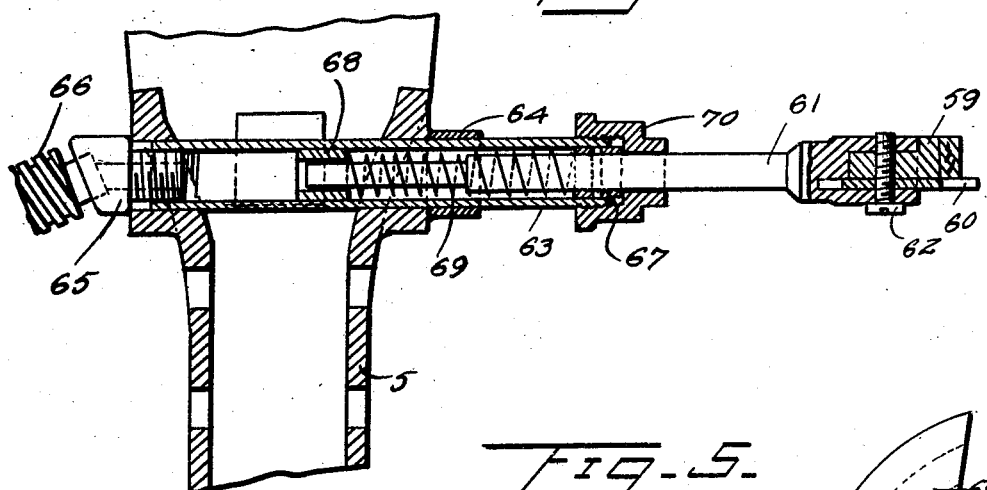
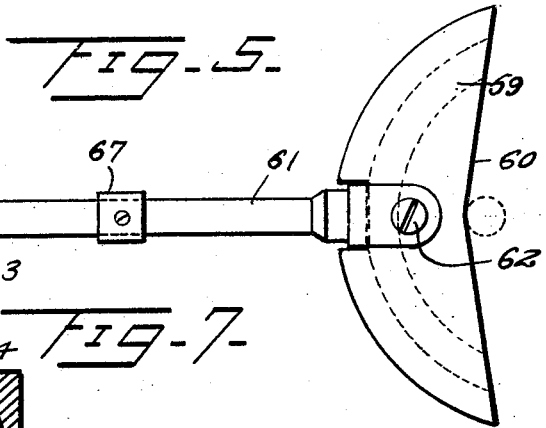
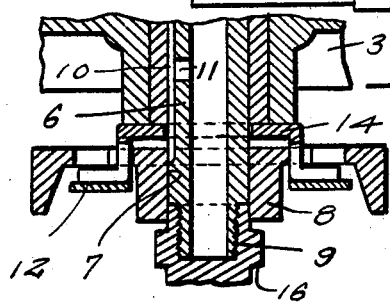
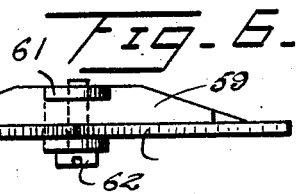
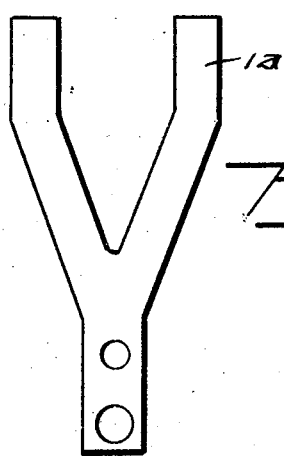
Inventor
Patsy Fasson,
Daniel Fasson.
By
Attorney

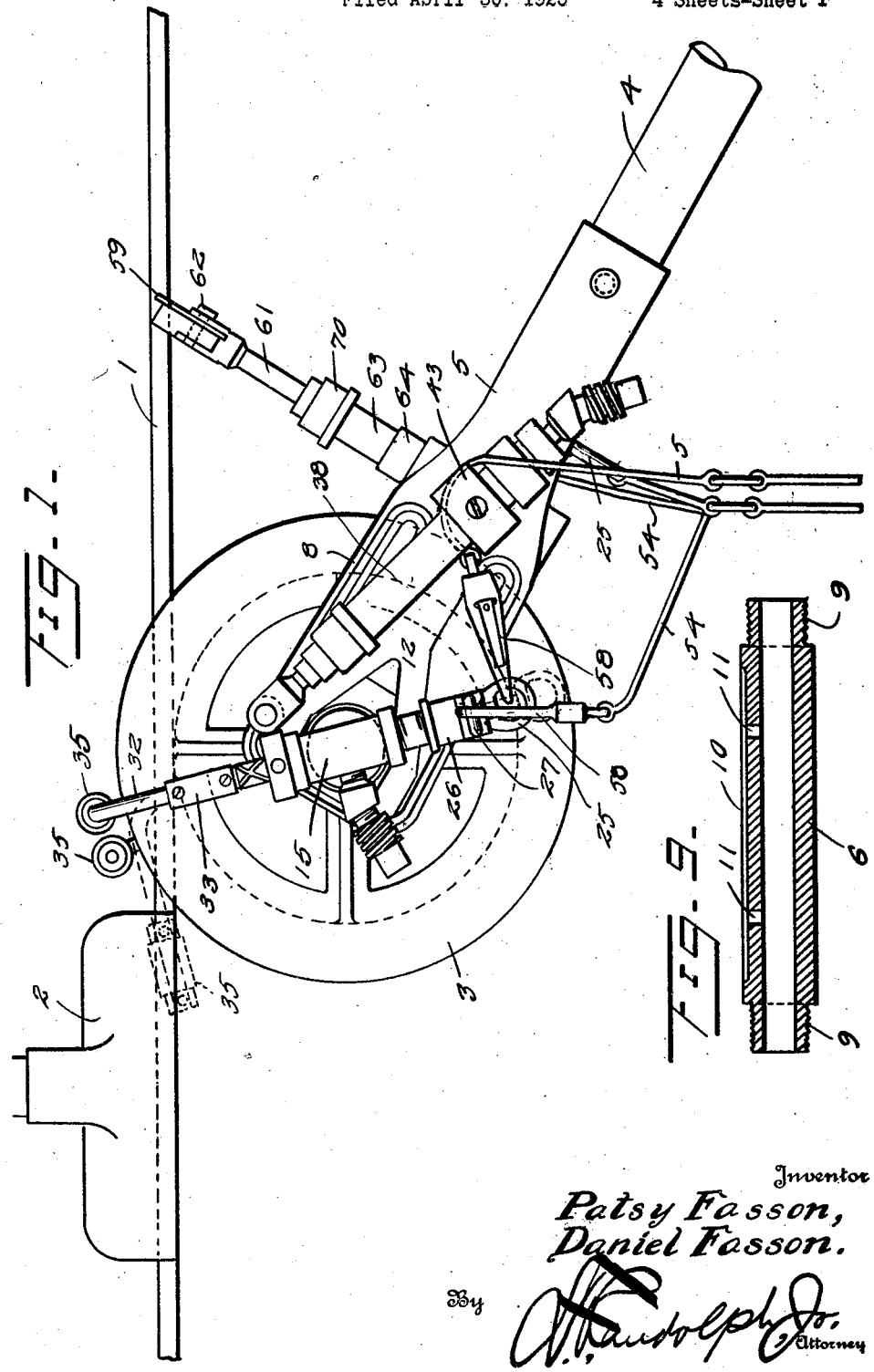

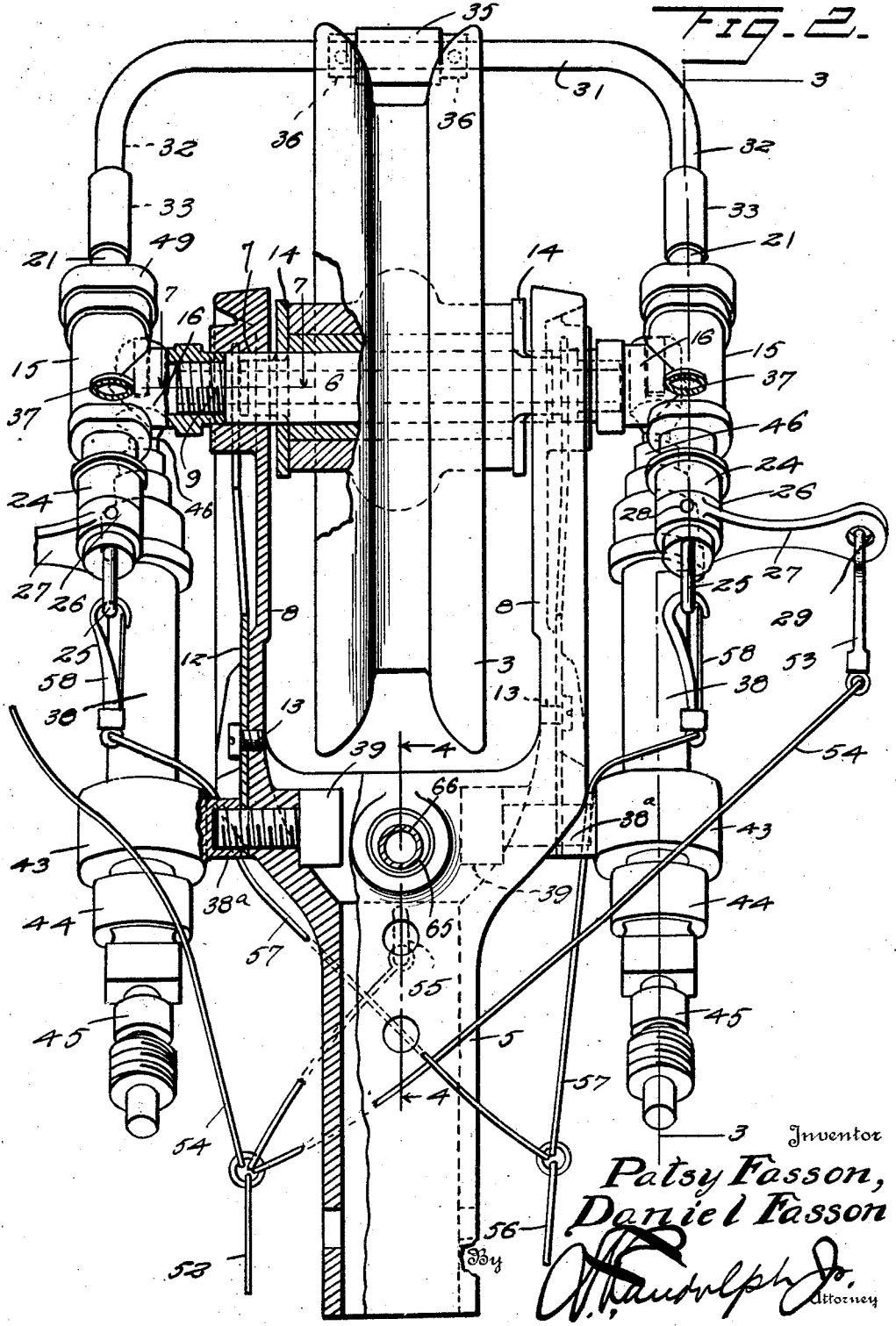

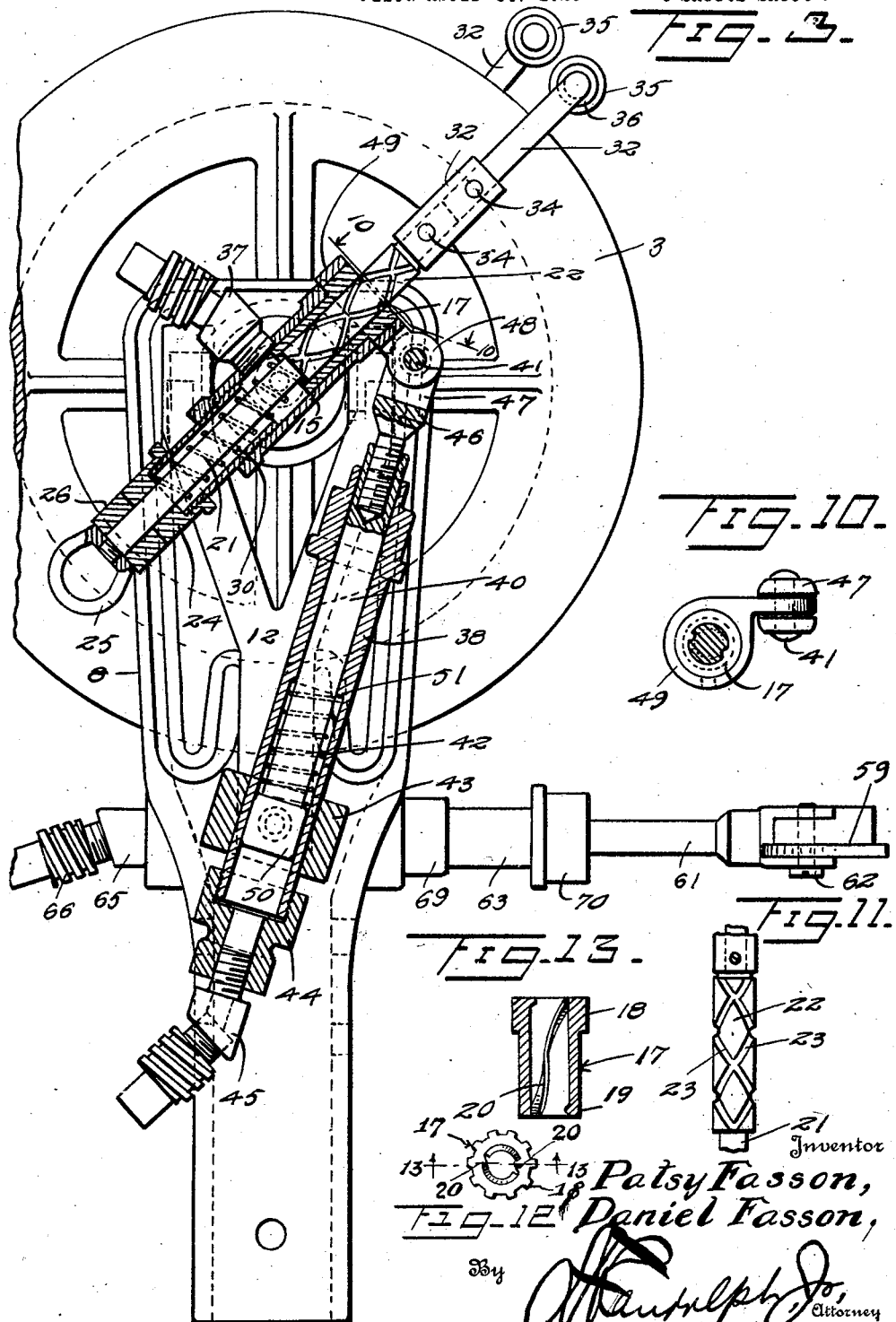

Patented May 10, 1927.

1,628,536

UNITED STATES PATENT OFFICE.

PATSY FASSON, OF MOUNT PLEASANT, PENNSYLVANIA, AND DANIEL FASSON, OF ROCHESTER, NEW YORK.

AUTOMATIC SAFETY TROLLEY.

Application filed April 30, 1925. Serial No. 26,975.

This invention relates to trolley wheel guards and trolley wire scrapers.

The invention has for one of its objects the provision of a guard which will prevent the trolley wheel from accidentally leaving the trolley wire, which will readily open on coming in contact with a trolley wire hanger and close immediately after passing the same, and which may be readily opened manually to permit it to pass the hanger during the backing of the car or to permit the trolley wheel to be drawn down out of contact with the wire.

A further object of the invention is the provision of a scraper which will effectively remove ice from the trolley wire in advance of the trolley wheel, which will readily pass trolley wire hangers, and which can be readily secured to a trolley pole.

The foregoing and other objects are attained by the construction, combination and arrangement of parts hereinafter fully described and claimed, and illustrated in the accompanying drawings, wherein:

Figure 1 is a view in side elevation illustrating the application of the trolley wheel guard and trolley wire scraper, Figure 2 is a view in rear elevation of the trolley pole harp, trolley wheel and guard, a portion of the harp and wheel being in section, Figure 3 is a sectional view taken on the plane indicated by the line 3—3 of Figure 2, Figure 4 is a detail sectional view taken on the plane indicated by the line 4—4 of Figure 2, Figure 5 is a plan view of the blade and stem or shank of the scraper, Figure 6 is a view in end elevation of the blade and shank of the scraper, Figure 7 is a detail sectional view taken on the plane indicated by the line 7—7 of Figure 2, Figure 8 is a detail view of one of the springs by which the trolley is maintained in central position upon its axle, Figure 9 is a detail sectional view of the trolley wheel axle, Figure 10 is a detail sectional view taken on the plane indicated by the line 10—10 of Figure 3, Figure 11 is an elevational view of one of the guard arm carrying shafts.

Figure 12 is a detail top plan view of one of the nuts through which the guard arm carrying shafts pass, and Figure 13 is a sectional view taken on the plane indicated by the line 13—13 of Figure 12.

Corresponding and like parts are referred to in the following description, and designated in the several views of the accompanying drawings, by similar reference characters.

In the drawings 1 designates a trolley wire, 2 a hanger therefor, 3 a trolley wheel, and 4 a trolley pole provided at its upper end with a harp 5. The trolley wheel 3 is loosely mounted on a hollow axle 6 which is journaled in bearing openings 7 in the arms 8 of the harp 5. The ends 9 of the axle 6 extend laterally beyond the sides 8 of the harp 5 and are reduced and externally screw threaded. To permit the wheel 3 to be lubricated in the manner hereinafter pointed out, the axle 6 is provided in its outer side with a longitudinally extending groove 10 which communicates with the interior of the axle by way of openings 11. The wheel 3 is maintained in a central position on the axle 6 by springs 12 secured at their lower ends to the arms 8 by screws 13 and contacting at their upper ends with collars 14 mounted on the axle and contacting with the ends of the hub of the wheel.

A cylinder 15 is secured to each end 9 of the axle 6 by a hollow screw threaded boss 16. Nuts 17 having heads 18 and cylindrical bodies 19, are secured to the upper ends of the cylinders 15 by pressing said bodies in said ends of the cylinders. The nuts 17 are provided with double spiral long pitch threads 20, the threads of one of the nuts being right hand and the other left hand. Shafts 21 are arranged within the cylinders 15 and are provided with enlarged portions 22 having double spiral long pitch grooves 23 for the reception of the threads 20. The lower ends of the cylinders 14 are provided with caps 24 through which the lower ends of the shafts 21 pass, and to said lower shaft ends loops or eyes 25 are secured. The hollow heads 26 of levers 27 are mounted on the lower ends of the shafts 21 between the caps 24 and the eyes or loops 25. The levers 27 are fixed to the shafts 21 by set screws 28, and are provided at their outer ends with openings 29. Springs 30 located within the cylinders 15 between the caps 24 and the lower ends of the enlarged portions 22 of the shafts 21, support the shafts, and the movement of the shafts under the influence of the springs is limited by the heads 26 of the levers 27. Arms 31 which extend inwardly over the wire 1 and which are provided with downwardly extending angular portions 32 connected to the upper ends of the shafts 21, prevent the pulley 3 from accidentally leaving the wire 1. The arms 31 are secured to the shafts 21 by sleeves 33 and set screws 34. The inner ends of the arms 31 are provided with rollers 35 which are situated directly above the wire 1 and which are secured in place by collars 36. To lubricate the wheel 3 and the working parts of the cylinders 15, grease cups 37 are connected to the cylinders. Some of the grease forced into the cylinders 15 by means of the cups 37 passes to the bushing of the wheel 3 by way of the hollow bosses 16, hollow axle 6 and openings 11. The lower ends of the sleeves 33 and the upper ends of the nuts 17 provide means for limiting the downward movement of the shafts 21 with respect to the cylinders 15.

The arms 31 are normally held in closed or wheel retaining position by means of the nuts 17 and springs 30. When the rollers 35 contact with a hanger the arms 31 are swung into opened position and immediately after passing the hanger they are returned to closed position. While being opened the arms 31 move rearwardly, outwardly and downwardly, the downward movement of the arms being effected by the nuts 17. During the downward movement of the arms 31, the springs 30 are compressed, and as soon as the arms pass the hanger the springs react and move the arms upwardly, inwardly and forwardly until the stops 36 contact with the caps 24.

Means for resiliently supporting the cylinders 15 and the parts associated therewith, comprises cylinders 38 connected to the harp 5 for limited rocking movement by bolts 39 which pass through the harp arms 8 and engage bosses 38ª carried by the cylinders. Plungers 40 slidably mounted in the cylinders 38 and pivotally connected as at 41 to the upper ends of the cylinders 15, and springs 42 arranged within the cylinders 38 and exerting a downward pressure upon the plungers. The cylinders 38 are provided adjacent their lower ends with collars 43 which are engaged by the bolts 39. The lower ends of the cylinders 38 are closed by caps 44 which carry grease cups 45 to permit lubrication of the plungers 40 and springs 42. Bolts 46 having threaded engagement with the upper ends of the plungers 40, are provided with bifurcated upper ends 47 for the reception of ears 48 carried by collars 49 secured to the nuts 17. The pivot pins 41 pass through the limbs of the bifurcated portions 47 of the bolts 46 and through the ears 48. The lower portions of the cylinders 38 are counter-bored to receive heads 49 on the lower ends of the pistons 40 and to provide shoulders 50 between which and the heads 49 the springs 42 are located.

The arms 31 can be opened manually by turning the shafts 21 through the medium of the levers 27, and to permit the arms to be thus opened when it is desired to pull down the trolley pole 4, a rope 52 is connected to the levers 27 by snap hooks 53 and branch ropes 54. The rope 52 is connected to a ring 55 secured to the under side of the harp 5 and has sufficient play to cause the opening of the arms 31 before any downward force can be exerted on the trolley pole 4.

As the arms 31 cannot be opened by a trolley hanger during the backing of the car there is provided means by which they may be held in position below the trolley wire during such operation of the car. This means comprises a rope 56 connected to the eyes or loops 25 by branch ropes 57 and snap hooks 58. The branch ropes 57 extend forwardly from the eyes or loops 25, pass about the bosses 38ª between the cylinders 38 and harp arms 8, and are connected to the rope 56 at the under side of the harp 5. After the trolley wheel 3 has been pulled down out of contact with the trolley wire, and while it is being held in such position, the cylinders 15 are by means of the rope 56 rocked to position the arms 31 rearwardly below the top of the trolley wheel 3. They are held in this position by means of the rope 56 until the car has been backed the desired or required distance. During this movement of the cylinders 15 the springs 42 are tensioned, and promptly upon the releasing of the rope 56 the springs 42 react and return the cylinders 15 and the arms 31 to normal position.

The means for removing ice from the wire 1 in advance of the pulley 3 comprises a blade 59 having an angular scraping edge 60, a shank 61 to which the blade is secured by a screw 62, and a cylinder 63 in which the shank 61 is slidably mounted. The cylinder 63 is secured to the harp 5 by a collar 64 and the plug 65. The plug 65 closes the lower end of the cylinder 63 and is provided with a grease cup 66 by which the working parts of the cylinder 63 may be lubricated. The stem 61 has secured thereto a collar 67, and the cylinder 63 is provided with a collar 68. A spring 69 positioned between the collars 67 and 68, yieldingly holds the blade 59 in contact with the wire 1. The movement of the blade 59 under the influence of the spring 69 is limited by a cap 70 secured to the upper end of the cylinder 63 for contact by the collar 67.

It should be understood that the drawings are merely illustrative and do not pretend to give exact proportions. Furthermore, the said drawings are illustrative of a preferred construction, it being our expectation that various changes and modifications may be made without departing from the spirit and scope of the invention.

What is claimed is:—

1. A trolley wheel guard comprising retaining arms, shafts to which the arms are secured, and means for supporting the shafts for endwise and rotative movements.

2. A trolley wheel guard comprising retaining arms, shafts to which the arms are secured, means for supporting the shafts for endwise and rotative movements, and means yieldingly supporting the first named means.

3. A trolley wheel guard comprising a support, a nut having a double thread carried by said support, a shaft having a double groove passing through the nut, a spring contacting with one end of the shaft, and a retaining arm carried by the other end of the shaft.

4. A trolley wheel guard comprising a cylinder, a nut carried by one end of the cylinder and provided with a double thread, a shaft extending through the nut and cylinder and provided with a double groove, a spring within the cylinder and contacting with the shaft, a stop secured to one end of the shaft, and a retaining arm secured to the other end of the shaft.

5. A trolley wheel guard comprising a rockable support, a nut carried by the support and having a double thread, a shaft passing through the nut and having a double groove, a spring contacting with the shaft, a retaining arm connected to the shaft, and means yieldingly retaining the support in normal position.

6. A trolley wheel guard comprising a rockable support, a nut carried by the support and having a double thread, a shaft passing through the nut and having a double groove, a spring contacting with the shaft, a retaining arm connected to the shaft, means yieldingly retaining the support in normal position, said means comprising a rockable cylinder, a spring pressed plunger carried by the cylinder, and a pivotal connection between the plunger and support.

7. A trolley wheel guard comprising a rockable support, yielding supporting means for said support, a shaft and means connecting the shaft to the support for endwise and rotative movements, and a retaining arm carried by the shaft.

8. In combination, a trolley harp, a hollow axle journaled in the harp and provided with radial openings, a wheel loosely mounted on the axle, cylinders connected to the axle and communicating therewith, lubricating elements carried by the cylinders, shafts carried by the cylinders, retaining arms carried by the shafts, and yielding supports carried by the harp and pivotally connected to the cylinders.

9. A trolley wheel guard comprising a rockable support, yielding supporting means for said support, a shaft, means connecting the shaft to the support for endwise and rotative movements, a spring carried by the support and cooperating with the shaft to maintain the latter in normal position, and a retaining arm carried by the shaft.

10. A trolley wheel guard comprising a retaining arm, a shaft to which the arm is secured, means for supporting the shaft for endwise and rotative movements, and a spring carried by the supporting means and cooperating with the shaft to maintain the latter in normal position.

11. A trolley guard comprising, in combination with the axle of the trolley wheel, a support carried by the axle, a shaft, means connecting the shaft to the support for endwise and rotative movements, and a retaining arm carried by the shaft.

12. A trolley wheel guard comprising, in combination with a rotatable axle, a trolley wheel journaled thereon, a support fixed to the axle, a shaft, means connecting the shaft to the support for endwise and rotative movements with respect thereto, a retaining arm carried by the shaft, and means yieldingly retaining the support in normal position.

13. In combination, a trolley harp, an axle journaled thereon, a trolley wheel mounted on the axle, a support carried by the axle, a shaft, means connecting the shaft to the support for endwise and rotative movements, a retaining arm carried by the shaft, and means pivotally connected to the harp for yieldingly retaining the support in normal position.

14. A trolley wheel guard comprising a rockable member, rockable means for yieldingly supporting the member, a shaft, means for connecting the shaft to the member for endwise and rotative movements, and a retaining arm carried by the shaft.

PATSY FASSON.
DANIEL FASSON.